US011924558B2

(12) United States Patent
Saito (10) Patent No.: US 11,924,558 B2
(45) Date of Patent: Mar. 5, 2024

(54) IMAGE PICKUP APPARATUS THAT PERFORMS OPTICAL IMAGE BLUR CORRECTION AND ALIGNMENT COMPOSITION OF PLURALITY OF STILL IMAGES SHOT IN TIME CONTINUOUS MANNER, CONTROL METHOD THEREOF, AND STORAGE MEDIUM (71) Applicant: CANON KABUSHIKI KAISHA, Tokyo (JP)

(72) Inventor: Junichi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 17/830,431

(22) Filed: Jun. 2, 2022

(65) Prior Publication Data

US 2022/0394169 A1 Dec. 8, 2022

(30) Foreign Application Priority Data

Jun. 8, 2021 (JP) ................................. 2021-095983

(51) Int. Cl.
*H04N 23/743* (2023.01)
*H04N 23/73* (2023.01)

(52) U.S. Cl.
CPC ........... *H04N 23/743* (2023.01); *H04N 23/73* (2023.01)

(58) Field of Classification Search
CPC ...... H04N 23/743; H04N 23/73; H04N 23/63; H04N 23/663; H04N 23/683; H04N 23/684; H04N 23/951; H04N 23/687
See application file for complete search history.

(56) References Cited

U.S. PATENT DOCUMENTS

2018/0041716 A1* 2/2018 Kajimura ................ G06T 5/003
2018/0176470 A1* 6/2018 Kim ......................... G03B 5/02
2018/0278822 A1* 9/2018 Takahashi ............. H04N 23/90

FOREIGN PATENT DOCUMENTS

JP 2004-279514 A 10/2004

\* cited by examiner

Primary Examiner — Luong T Nguyen
(74) Attorney, Agent, or Firm — Venable LLP

(57) ABSTRACT

An image pickup apparatus, a control method thereof, and a storage medium, the image pickup apparatus being capable of shooting a plurality of still images under an appropriate exposure condition when the image pickup apparatus including a camera system performs alignment composition of the still images shot in a time continuous manner. An exposure time for each of the still images and a total number of the still images are set based on the focal length information, the optical image blur correction angle information, and the response characteristic information.

11 Claims, 4 Drawing Sheets

IMAGE PICKUP APPARATUS THAT PERFORMS OPTICAL IMAGE BLUR CORRECTION AND ALIGNMENT COMPOSITION OF PLURALITY OF STILL IMAGES SHOT IN TIME CONTINUOUS MANNER, CONTROL METHOD THEREOF, AND STORAGE MEDIUM

BACKGROUND OF THE INVENTION

Field of the Invention

The present invention relates to an image pickup apparatus, a control method thereof, and a storage medium, and particularly relates to an image pickup apparatus that performs optical image blur correction and alignment composition of a plurality of still images shot in a time continuous manner, a control method thereof, and a storage medium.

Description of the Related Art

A so-called image blur correction technique for reducing influence of unnecessary vibration such as hand-shaking applied to an image pickup apparatus by moving a part of a shooting optical system or an image pickup device in a plane perpendicular to an optical axis is widely adopted in the image pickup apparatus such as a digital still camera.

Furthermore, in recent years, a technique has been widely adopted in which a plurality of still images are shot by the image pickup device in a time continuous manner, composition of the images is performed by various addition methods while performing alignment of the images sequentially, and the alignment composition is performed in which effects similar to the image blur correction (image stabilization) are obtained.

Japanese Laid-Open Patent Publication (kokai) No. 2004-279514 discloses a technique in which a plurality of still images shot in a time continuous manner in an exposure time shorter than a hand shaking limit exposure time are composed to obtain an appropriate exposure image in a case where an exposure time is longer than a preset hand shaking limit exposure time unique to a photographer. According to this, in the shooting of the image in which the hand shaking limit exposure time unique to the photographer is exceeded, it is possible to obtain an appropriate exposure image with less hand shaking influence by composing still images one by one.

Furthermore, in the technique of Japanese Laid-Open Patent Publication (kokai) No. 2004-279514, it is also disclosed that whether or not to perform the alignment composition is determined by determining the degree of influence of the hand shaking by using detection information of a camera angle detection sensor, focal length information, and diaphragm information.

However, Japanese Laid-Open Patent Publication (kokai) No. 2004-279514 does not disclose hand shaking correction performance for each combination of components, which is an extremely important factor, in a lens interchangeable camera system or a camera system in which a set of a plurality of image pickup devices and an optical system is incorporated.

SUMMARY OF THE INVENTION

The present invention provides an image pickup apparatus, a control method thereof, and a storage medium, the image pickup apparatus being capable of shooting a plurality of still images under an appropriate exposure condition when the image pickup apparatus including a camera system performs alignment composition of the still images shot in a time continuous manner.

Accordingly, the present invention provides an image pickup apparatus including an image pickup device that receives a light flux transmitted through a shooting optical system and performs photoelectric conversion, and an optical image blur correction unit that drives the shooting optical system and/or the image pickup device, the image pickup apparatus comprising at least one processor, and a memory coupled to the at least one processor, the memory having instructions that, when executed by the processor, perform the operations as a control unit configured to acquire a plurality of still images in a time continuous manner by the image pickup device, a composite image generation unit configured to align the still images to generate a composite image, and a setting unit configured to set an exposure time for each of the still images and a total number of the still images based on information regarding a focal length of the shooting optical system, information regarding an image blur correctable amount of the optical image blur correction unit, and information regarding a response characteristic of the optical image blur correction unit in a predetermined band of vibration applied to the image pickup apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

An image pickup apparatus 1000 including a camera system according to an embodiment of the present invention will be described with reference to the drawings. It should be noted that the following embodiments do not limit the present invention according to the claims, and all combinations of features described in the present embodiments are not necessarily essential to means for solving the problem of the present invention.

Figure 1A:
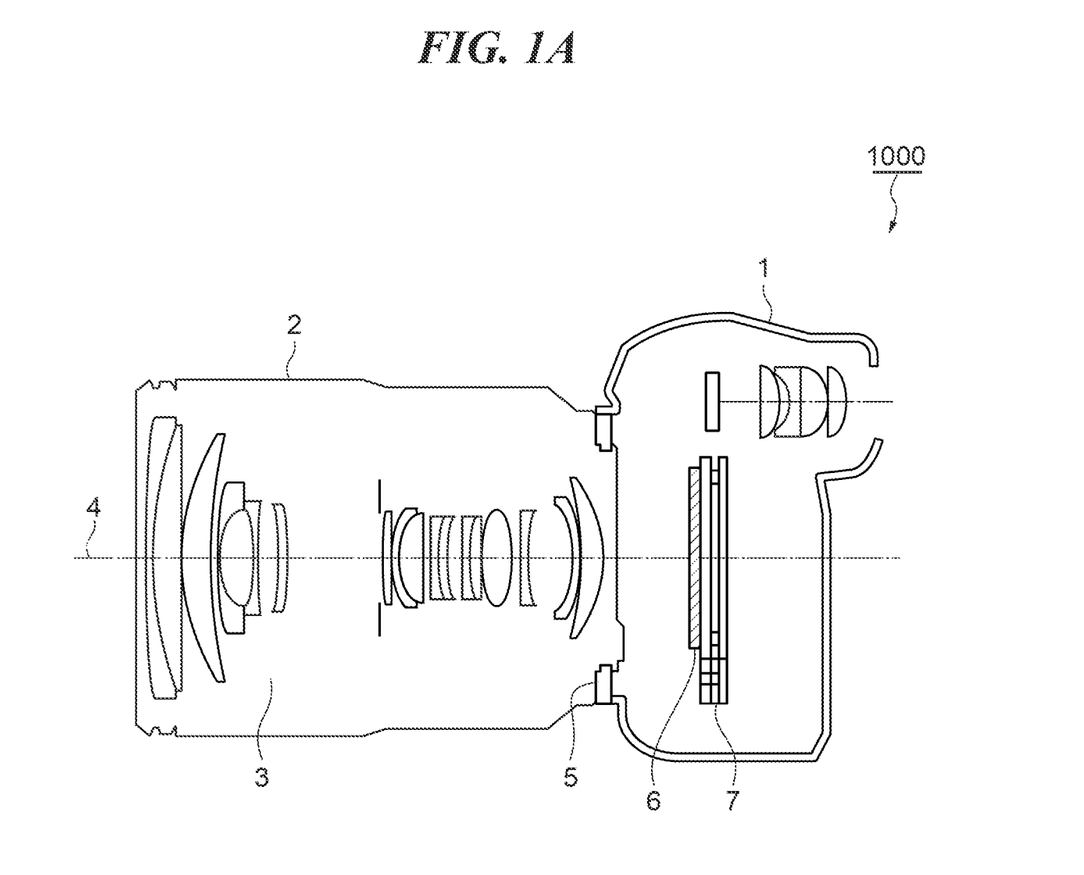
FIG. 1A is a central cross-sectional view of an image pickup apparatus according to the present invention.
Figure 1B:
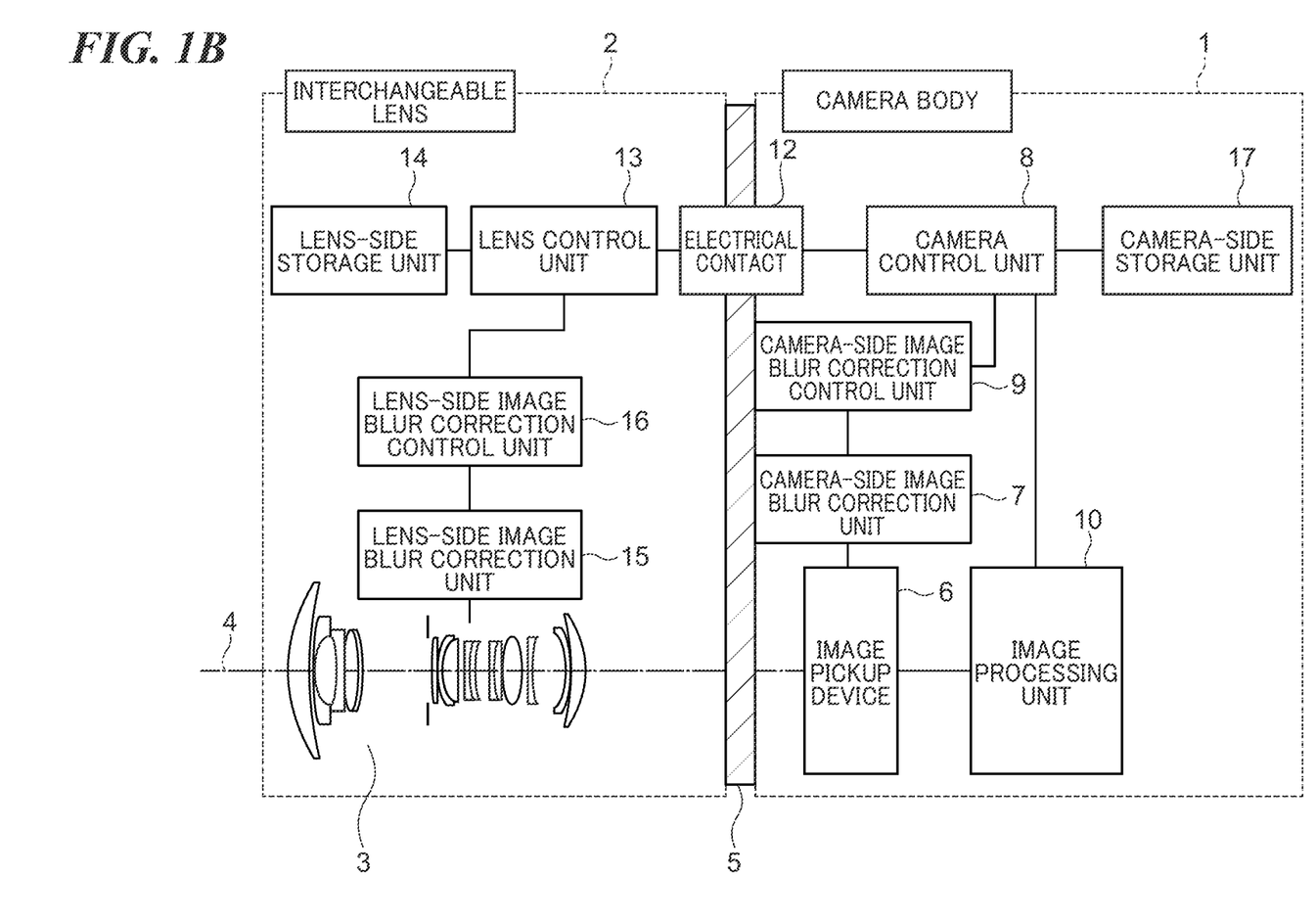
FIG. 1B is a block diagram showing an electrical configuration of the image pickup apparatus.

FIGS. 1A and 1B are schematic conceptual diagrams showing a configuration of the image pickup apparatus 1000 according to the present invention. FIG. 1A is a central cross-sectional view of the image pickup apparatus 1000, and FIG. 1B is a block diagram showing an electrical configuration of the image pickup apparatus 1000. Members denoted by the same reference numerals in FIGS. 1A and 1B correspond to each other.

In FIGS. 1A and 1B, the image pickup apparatus 1000 includes a camera body 1, a mount block 5, and interchangeable lens 2 mounted to the camera body 1 via the mount block 5.

As shown in FIG. 1A, the camera body 1 includes an image pickup device 6 and a camera-side image blur correction unit 7. Furthermore, the interchangeable lens 2 includes a shooting optical system 3 on an optical axis 4.

Specifically, the camera system formed by the image pickup apparatus 1000 is a so-called lens interchangeable single lens camera, and various interchangeable lenses (interchangeable lens 2 in the present embodiment) are attachable and detachable via the circular mount block 5. It should be noted that the image pickup apparatus 1000 is the lens interchangeable single lens camera, but is not limited to this as long as it is a camera system in which the hand shaking correction performance changes for each combination of components. For example, even when the image pickup apparatus 1000 is a mobile apparatus such as a smartphone including a plurality of image pickup apparatuses using different combinations of lenses and image pickup devices according to a focal length area, the effects of the present invention can be exhibited.

Furthermore, as shown in FIG. 1B, the camera body 1 includes a camera control unit 8, a camera-side image blur correction control unit 9, an image processing unit 10, an electrical contact 12, and a camera-side storage unit 17, in addition to the configuration shown in FIG. 1A. Furthermore, in addition to the configuration shown in FIG. 1A, the interchangeable lens 2 includes a lens control unit 13, a lens-side storage unit 14, a lens-side image blur correction unit 15, and a lens-side image blur correction control unit 16.

In the camera system formed by the image pickup apparatus 1000, a light flux from a shooting field angle centered on the optical axis 4 of the shooting optical system 3 of the interchangeable lens 2 passes through the shooting optical system 3, and is received and formed as a subject image on the image pickup device 6 disposed in the camera body 1.

After the subject image is accumulated as electric charge for a predetermined exposure time, the accumulated subject images are photoelectrically converted to be an electric signal (image signal or still image) in a photoelectric conversion unit (not shown) of the image pickup device 6, and sent to the image processing unit 10. The exposure time is determined by the camera control unit 8 based on setting contents of the photographer, brightness of a subject, and the like. The image pickup apparatus 1000 has a continuous shooting function of performing the accumulation and the photoelectric conversion in a time continuous manner.

In the image processing unit 10, the image signal is subjected to development processing, gamma processing, and the like to be in an image file format, and the camera control unit 8 causes the image file format to be saved in a nonvolatile memory (not shown). Furthermore, the image processing unit 10 has a function as a composite image generation unit that performs relative alignment of the still images based on feature point information of a plurality of the still images obtained by the above-described continuous shooting function. Moreover, the image processing unit 10 can perform shooting operation including alignment composition processing of obtaining one composite image from a plurality of images by addition processing or the like. Details of the shooting operation including the alignment composition processing performed by the image pickup apparatus 1000 will be described later.

The image pickup device 6 disposed in the camera body 1 is configured to be movable in a plane perpendicular to the optical axis 4 by the camera-side image blur correction unit 7 (optical image blur correction unit). Furthermore, the camera-side image blur correction control unit 9 (optical image blur correction control unit) drives and controls the camera-side image blur correction unit 7.

Similarly, an image blur correction optical system (details are not shown) which is a part of the shooting optical system 3 of the interchangeable lens 2 is configured to be movable in a plane perpendicular to the optical axis 4 by the lens-side image blur correction unit 15 (optical image blur correction unit). Furthermore, the lens-side image blur correction control unit 16 (optical image blur correction control unit) drives and controls the lens-side image blur correction unit 15.

That is, the camera-side image blur correction unit 7 and the lens-side image blur correction unit 15 drive the image blur correction optical system and/or the image pickup device 6, and thus a position of an optical image formed on a surface of the image pickup device 6 can be changed.

The camera control unit 8 and the lens control unit 13 cooperate with each other by communication via the electrical contact 12, and perform drive control for reducing unnecessary vibration input to the image pickup apparatus 1000 by using the camera-side image blur correction unit 7 and the lens-side image blur correction unit 15, respectively. At this time, the vibration is detected as angular velocity information by an angular velocity sensor (not shown: detection unit) disposed in each of the camera body 1 and the interchangeable lens 2, but both or one of pieces of the angular velocity information is used according to a method for cooperative control performed by the camera control unit 8 and the lens control unit 13.

In the camera system including the image pickup apparatus 1000 of the present embodiment shown in FIGS. 1A and 1B, the lens control unit 13 drives and controls various drive units via various control units (not shown) in accordance with an instruction given from the camera body 1 side. For example, the lens control unit 13 drives and controls a focus adjusting unit (not shown) and a diaphragm unit (not shown) via a focus adjustment control unit (not shown) and a diaphragm control unit (not shown) according to focus detection information and photometry information of the subject obtained by the image processing unit 10, and adjusts an image forming state and a diaphragm state of the subject image.

The lens-side storage unit 14 stores current focal length information of the interchangeable lens 2, an image blur correction angle of the lens-side image blur correction unit 15, response characteristic information in a specific frequency band, and the like. The focal length information, the image blur correction angle of the lens-side image blur correction unit 15, and the response characteristic information, which are stored in the lens-side storage unit 14, are referred to by the lens control unit 13 and by the camera control unit 8 disposed in the camera body 1 via the electrical contact 12.

The camera control unit 8 issues a command related to drive control of the camera-side image blur correction unit 7 to the camera-side image blur correction control unit 9 based on the focal length information received from the interchangeable lens 2 and the image blur correction angle of the lens-side image blur correction unit 15. At this time, the camera control unit 8 calculates the image blur correction angle of the camera-side image blur correction unit 7 based on the focal length information received from the lens control unit 13. Furthermore, the camera control unit 8 determines the image blur correction angle that can be exhibited by the image pickup apparatus 1000 and a drive amount ratio of the camera-side image blur correction unit 7 to the lens-side image blur correction unit 15 based on the calculated image blur correction angle and the image blur correction angle of the lens-side image blur correction unit 15. Moreover, the camera control unit 8 (setting unit) sets exposure at the time of the composite image generation of the image processing unit 10 based on the focal length information received from the interchangeable lens 2, the image blur correction angle of the lens-side image blur correction unit 15, and the response characteristic information.

The camera-side storage unit 17 stores an exposure table or the like that is referred to for determining the exposure at the time of the alignment composition processing for continuous shooting image performed by the image pickup apparatus 1000 to be described later.

In the present embodiment, the camera body 1 includes the camera-side image blur correction unit 7, and the interchangeable lens 2 includes the lens-side image blur correction unit 15, but the present invention is not limited to this, and the image blur correction may be performed by any one of the camera-side image blur correction unit 7 and the lens-side image blur correction unit 15.

Figure 2:
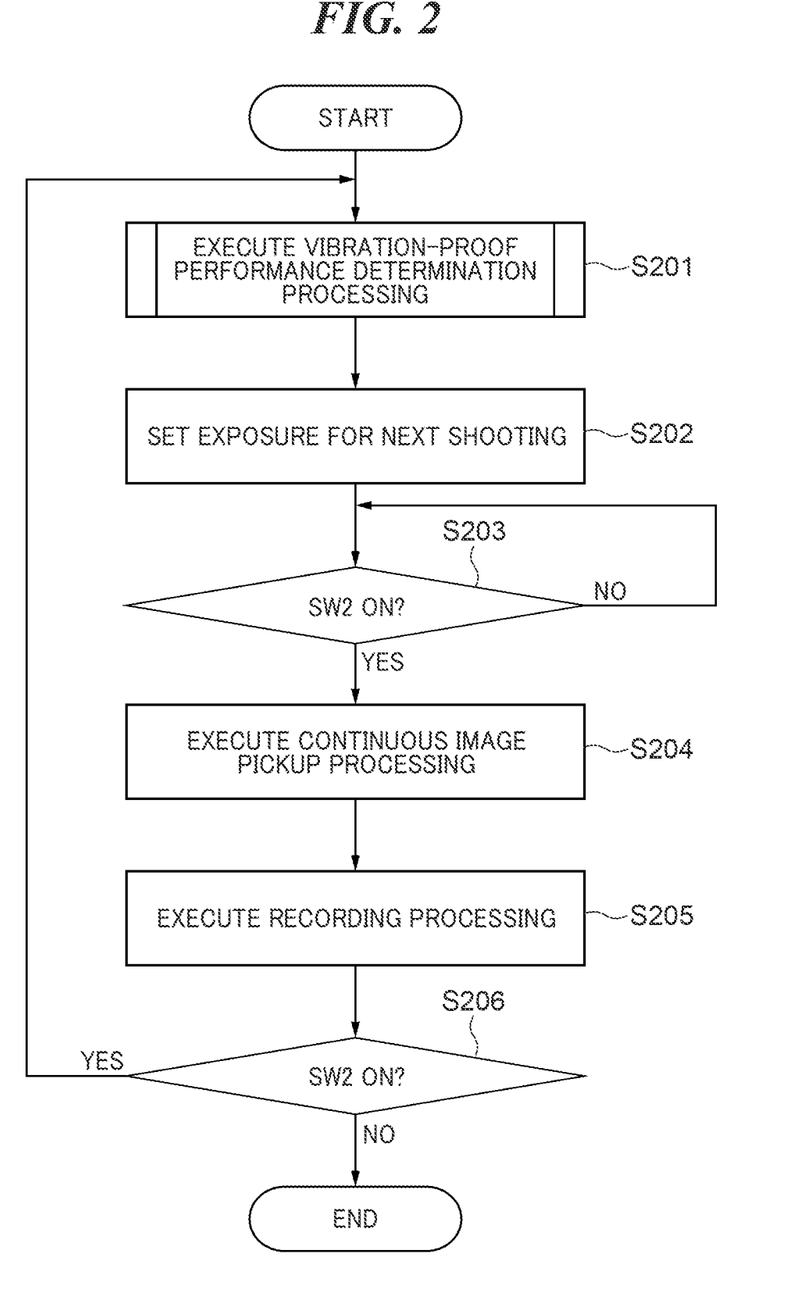
FIG. 2 is a flowchart of continuous shooting processing executed by the image pickup apparatus.

FIG. 2 is a flowchart of continuous shooting processing executed by the image pickup apparatus 1000. This processing is started when the image pickup apparatus 1000 is powered on. It should be noted that in actual shooting, operation such as focus adjustment is also performed, but there is no influence on the effect of the present invention, and thus the description thereof will be omitted.

This processing is executed by the camera control unit 8 reading a program from a ROM (not shown) provided in the camera body 1 and deploying the program in a RAM (not shown) also provided in the camera body 1.

First, in step S201, an image blur correction performance determination processing which is a subroutine is performed. Although details will be described later with reference to FIG. 3, in the image blur correction performance determination processing, the camera control unit 8 determines current image blur correction performance of the image pickup apparatus 1000.

In step S202, the camera control unit 8 (setting unit) sets an exposure condition for the next continuous shooting based on the image blur correction performance determined in step S201. Specifically, in addition to setting of a shutter device and a diaphragm unit (not shown) disposed in the interchangeable lens 2 or setting of sensitivity (so-called ISO sensitivity) of photoelectric conversion of the image pickup device 6 disposed in the camera body 1, the exposure time for each shot and the number of shot images are set for the continuous shooting image.

In step S203, the camera control unit 8 determines whether or not a shooting start instruction has been given by the photographer, specifically, whether or not a switch (hereinafter, referred to as SW2) (not shown) has been turned on when a release button is pressed by the photographer. When the SW2 is turned on (YES in step S203), the processing proceeds to step S204, and when the SW2 is not turned on (NO in step S203), the processing returns to step S203.

In step S204, the camera control unit 8 (control unit) executes continuous image pickup processing using the image pickup device 6 based on the exposure condition set in step S202. In the present embodiment, when the continuous shooting images are acquired in the image pickup apparatus 1000, the image processing unit 10 (composite image generation unit) first extracts a feature point of each of the continuous shooting images. Thereafter, the alignment is sequentially performed based on an existing method such as template matching, and addition processing is performed to generate one composite image. By decreasing the exposure time of the continuous shooting image, it is possible to reduce a blur amount in one frame. Since the alignment composition is sequentially performed, the apparent total exposure time can be increased, and finally one image with a reduced blur amount is obtained. In a case where an addition-averaging method is used at the time of the composition, it is also possible to obtain a secondary effect that random noise appearing in the image is uniformed and smoothed.

In step S205, the camera control unit 8 executes recording processing of recording and saving one composite image obtained in the processing of step S204 in a nonvolatile memory (not shown).

In step S206, the camera control unit 8 determines again whether or not the SW2 is turned on, that is, whether or not an instruction for continuous shooting is being continued. Here, in a case where the SW2 is turned on (YES in step S206), the processing returns to step S201. That is, after the power is supplied, the image blur correction performance is determined (updated) again when the focal length is changed. On the other hand, in a case where the SW2 is not turned on (NO in step S206), the processing ends.

Figure 3:
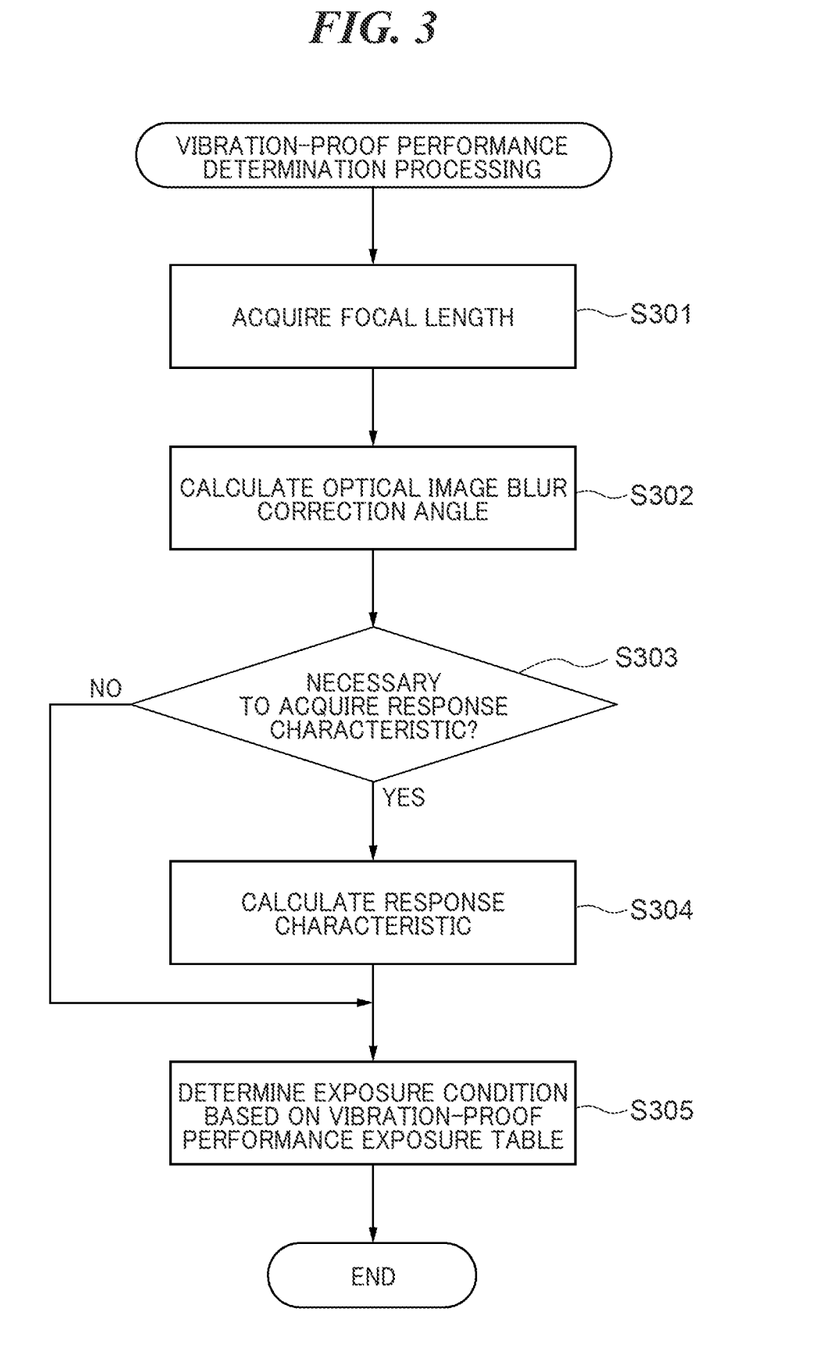
FIG. 3 is a flowchart of a subroutine of an image blur correction image blur correction performance determination processing of Step S201 in FIG. 2.

FIG. 3 is a flowchart of a subroutine of the image blur correction performance determination processing of Step S201 in FIG. 2. The subroutine is sequentially executed by the camera control unit 8 with reference to both of the various information stored in the lens-side storage unit 14 and the various information stored in the camera-side storage unit 17 as described above.

In step S301, the camera control unit 8 (acquisition unit) acquires the focal length information (information regarding a focal length) stored in the lens-side storage unit 14 from the interchangeable lens 2. In general, when the focal length increases, the blur amount appearing on an image plane increases with respect to a blur angle input to the image pickup apparatus 1000. To the contrary, when the focal length decreases, the blur amount appearing on the image plane decreases with respect to the blur angle input to the image pickup apparatus 1000. Accordingly, in the present embodiment, a necessary image blur correction angle according to the focal length is calculated in next step S302, and image blur correction performance of the image pickup apparatus 1000 is determined based on the calculated image blur correction angle. Details will be described later. It should be noted that the focal length information is stored in the lens-side storage unit 14 in the present embodiment, but the present invention is not limited to this. For example, in the case of an optical system having a zoom function, such as a zoom lens, the lens control unit 13 may calculate a current zoom state (focal length) based on table data of the focal length information in the lens-side storage unit 14 and pass the current zoom state to the camera control unit 8 by communication as needed. Furthermore, in a case where the image pickup apparatus 1000 is, for example, a camera system in which a combination of the image pickup device and the shooting optical system is changed according to an instruction of the photographer, the image pickup apparatus 1000 may have a mechanism for replacing the focal length information, when this combination has been changed, with another which corresponds to the changed combination.

In step S302, the camera control unit 8 acquires, from the interchangeable lens 2, information of the image blur correction angle of the lens-side image blur correction unit 15 (hereinafter, referred to as a lens-side image blur correction angle), the information being stored in the lens-side storage unit 14. At the same time, the camera control unit 8 calculates an image blur correction angle of the current camera-side image blur correction unit 7 (hereinafter, referred to as a camera-side image blur correction angle) by using the focal length information acquired in step S301. Specifically, the camera-side image blur correction angle is calculated as an angle obtained from a tangent between a stroke amount of the camera-side image blur correction unit 7 and the focal length (focal length information) of the shooting optical system 3. It should be noted that the camera-side image blur correction angle is calculated using the tangent in the present embodiment, but the camera-side image blur correction angle may be calculated by being approximated by a simple ratio of the stroke amount to the focal length depending on conditions. An optical image blur correction angle that is the sum of the lens-side image blur correction angle and the camera-side image blur correction angle which are obtained here is calculated. As described above, since the image blur correction angle necessary for blurring changes due to a relative relationship with the focal length, in the present embodiment, the image blur correction performance of the image pickup apparatus 1000 is determined based on the optical image blur correction angle that can be exhibited by the image pickup apparatus 1000 at the current focal length. It should be noted that in a case where only one of the lens-side image blur correction unit 15 and the camera-side image blur correction unit 7 is used according to the focal length, either the lens-side image blur correction unit 15 or the camera-side image blur correction unit 7, which is used, determines the optical image blur correction angle of the image pickup apparatus 1000 at a changeable optical axis angle.

In step S303, the camera control unit 8 determines whether or not it is necessary to acquire the response characteristic information of the image pickup apparatus 1000. Generally, the focal length information and the optical image blur correction angle greatly contribute to the correction of the image blur. However, there is a possibility that the correction performance of the image blur can be influenced by the detectability for the blur amount, and the responsibility for the detected blur amount. Hereinafter, information of those of the detectability and the responsibility are called as the response characteristic information of the optical image blur correction unit. For example, there is a possibility that a blur amount in a predetermined band to be accurately detected, for example, a low frequency band of 5 Hz or less may be insufficiently detected or excessively detected depending on the performance of the angular velocity sensor disposed in each of the camera body 1 and the interchangeable lens 2. In this case, the camera-side image blur correction unit 7 or the lens-side image blur correction unit 15 cannot issue a position command for moving the image pickup device 6 or the image blur correction optical system to an appropriate position. Furthermore, even when the performance of the angular velocity sensor disposed in the interchangeable lens 2 is sufficiently high and the blur amount in the predetermined band to be accurately detected can be detected, there is a possibility that the lens-side image blur correction control unit 16 and the lens-side image blur correction unit 15 cannot correctly respond to the detected blur amount. Also in this case, accurate image blur correction cannot be realized. The same applies to the angular velocity sensor disposed in the camera body 1. Therefore, specifically, in step S303, the camera control unit 8 confirms whether the image pickup apparatus 1000 falls under any of these cases and it is necessary to acquire the response characteristic information of the image pickup apparatus 1000.

In a case where it is necessary to acquire the response characteristic information of the image pickup apparatus 1000 (YES in step S303), the processing proceeds to step S304, and otherwise, the processing proceeds to step S305. It should be noted that in a case where it is unnecessary to acquire the response characteristic information of the image pickup apparatus 1000, in step S305 to be described below, the image blur correction performance is determined based on the "focal length information" and the "optical image blur correction angle information" which are obtained in steps S301 and S302, respectively. That is, the camera control unit 8 determines that the image blur correction performance is higher in a case where the optical image blur correction angle is a second angle greater than a first angle as compared with a case of the first angle. Furthermore, it is determined that the image blur correction performance is lower in a case where the focal length is a second distance longer than a first distance as compared with a case of the first distance. It should be noted that in a case where it is known in advance that the image pickup apparatus 1000 does not fall under any of the cases described above in step S303, the processing may directly proceed from step S302 to step S305.

In step S304, the camera control unit 8 acquires the response characteristic information of the image pickup apparatus 1000. Specifically, similarly to the focal length information, the camera control unit 8 receives, by communication, information regarding a lens-side response characteristics stored in the lens-side storage unit 14. Moreover, the camera control unit 8 combines information regarding response characteristics of a camera-side response characteristic and the information regarding the lens-side response characteristics to calculate the response characteristic of the image pickup apparatus 1000.

Here, information regarding the lens-side response performance may include not only information regarding a mechanical response characteristic (lens-side response characteristic) with respect to a position command in a predetermined band (for example, a low frequency band of 5 Hz or less) in which vibration including hand shaking is assumed to be applied to the image pickup apparatus 1000 (i.e. response performance of the lens-side image blur correction unit 15 and the lens-side image blur correction control unit 16). For example, information regarding a drift characteristic of the angular velocity sensor disposed in the interchangeable lens 2 may also be included in the information regarding the lens-side response performance. Here, the drift characteristic particularly refers to a fluctuation characteristic of a detection angular velocity in a stationary state or in the predetermined band. Similarly, information regarding the camera-side response performance may include not only information regarding a mechanical response characteristic (camera-side response characteristic) with respect to a position command in the predetermined band (i.e. response performance of the camera-side image blur correction control unit 9 and the camera-side image blur correction unit 7), but also information regarding the drift characteristic of the angular velocity sensor disposed in the camera body 1. In this case, it is determined whether or not accurate image blur correction can be realized in the predetermined band (image blur correction performance) based on not only the mechanical response characteristic but also the drift characteristic of each angular velocity sensor disposed in the image pickup apparatus 1000. It should be noted that in the present embodiment, the drift characteristic of each angular velocity sensor disposed in the image pickup apparatus 1000 may be used to determine the image blur correction performance, but the present invention is not limited to this. For example, an angular velocity sensor unit, a sub camera, LiDAR, or the like that can be externally attached to the image pickup apparatus 1000 may be attached as a device that ensures the accuracy of the position command of the image pickup apparatus 1000. In this case, the drift characteristic detected by these devices may be used to determine the image blur correction performance. Furthermore, there is a case where a so-called panning mode, in which panning is intentionally performed during an exposure operation of the image pickup apparatus 1000 toward a direction of the subject, is selected. In this case, the drift characteristic of each angular velocity sensor disposed in the image pickup apparatus 1000 in the panning direction may not be used to determine the image blur correction performance. It should be noted that the predetermined band indicates at least a part of band where the alignment composition can correct the image blur, among the band where the lens-side image blur correction unit 15 or the camera-side image blur correction unit 7 performs the image blur correction. It is preferable that the lens-side image blur correction unit 15 or the camera-side image blur correction unit 7 also performs the image blur correction over band higher than the predetermined band.

It should be noted that the lens-side response characteristic information is stored in the lens-side storage unit 14, but the present invention is not limited to this, and the camera control unit 8 is only required to be capable of grasping the response characteristic in the frequency band of the lens-side image blur correction unit 15. For example, the camera control unit 8 may hold the lens-side response characteristic information for each interchangeable lens in the camera-side storage unit 17 in advance, and read the lens-side response characteristic information of the interchangeable lens 2 from the camera-side storage unit 17 based on basic information such as a lens name of the interchangeable lens 2 obtained by communication.

Furthermore, although different from the present embodiment, for example, in a case where the image pickup apparatus 1000 performs image blur correction with a gimbal mechanism or the like that holds the entire image pickup apparatus 1000, the response characteristic information in a predetermined band, which is possessed by the gimbal mechanism and a control unit of the gimbal mechanism, is only required to be capable of being used. At this time, the weight of the entire image pickup apparatus 1000, which changes according to the attachment of accessories, may be detected, and the response characteristic information obtained from the current situation of the image pickup apparatus 1000 may be used. Similarly, although different from the present embodiment, for example, the image pickup apparatus 1000 may perform image blur correction with a swing mechanism that swings a lens module itself holding the lens and the image pickup device. In this case, the response characteristic information in a predetermined band, which is possessed by the swing mechanism and a control unit of the swing mechanism, is only required to be capable of being used. Furthermore, the image pickup apparatus 1000 may include a so-called vari-angle liquid crystal having a degree of freedom on two axes. In this case, a detection result that the vari-angle liquid crystal is used in the state of being opened to the outside of the image pickup apparatus 1000 may be included in the response characteristic information as information that can be assumed to be a situation in which blurring is likely to occur.

Next, in step S305, "image blur correction performance" is determined based on the "focal length information," the "optical image blur correction angle information," and the "response characteristic information in the predetermined band", which are obtained in steps S301, S302, and S304, and the exposure condition is determined based on the image blur correction performance. Specifically, an exposure table associated with the image blur correction performance is stored in advance in the camera-side storage unit 17, the determined image blur correction performance is collated with the exposure table, and the exposure time per shot and the total number of shot images used for the alignment composition in continuous shooting executed after the subroutine in FIG. 3 is determined. In the present embodiment, in a case where the "image blur correction performance" is high (second performance) (the focal length is less than a predetermined value, the optical image blur correction angle is a predetermined value or greater, and the response characteristic in the predetermined band is a predetermined value or greater), the exposure time per shot in the continuous shooting is determined to be a relatively long time, and the total number of shot images is determined to be a relatively small number of shot images. This is because, in a case where the image blur correction performance is high, it is possible to sufficiently suppress the blur amount in one image before composition, and it is possible to obtain sufficient exposure even when the total number of shot images used for alignment composition is small. On the other hand, in a case where the "image blur correction performance" is low (first performance) (the focal length is a predetermined value or greater, the optical image blur correction angle is less than a predetermined value, or the response characteristic in the predetermined band is less than a predetermined value), the exposure time per shot in the continuous shooting is determined to be a relatively short time, and the total number of shot images is determined to be a relatively large number of shot images. According to this, it is possible to suppress the blur amount in the image before composition and to properly expose the composite image. In the case where a plurality of images are composed, it is expected that the shapes of the feature points among the images become similar to each other when the blur amount of each image before composition is sufficiently reduced, and it is possible to more accurately detect a position deviation amount. It should be noted that an image blur due to vibration in higher band than the predetermined band can be suppressed by the image blur correction performed by the camera-side image blur correction unit 7 and the lens-side image blur correction unit 15 regardless of the image blur correction performance. When the collation with the exposure table is finished and the exposure conditions such as the exposure time of the image before composition and the total number of shot images before composition in the continuous image pickup processing executed in step S204 of FIG. 2 are determined, this subroutine ends.

According to the present embodiment, when the continuous shooting images to be subjected to the alignment composition are generated, the image blur correction performance of the image pickup apparatus 1000 is determined based on the focal length information, the optical image blur correction angle information, and the response characteristic information. According to this, appropriate exposure conditions (the exposure time of the image before composition and the total number of shot images before composition) can be set.

Although the preferred embodiments of the present invention have been described above, the present invention is not limited to these embodiments, and various modifications and changes can be made within the scope of the gist of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-095983, filed Jun. 8, 2021 which is hereby incorporated by reference herein in its entirety.

What is claimed is:

1. An image pickup apparatus comprising:
   an image pickup device configured to (a) receive a light flux transmitted through a shooting optical system and (b) perform photoelectric conversion;
   at least one processor; and
   a memory coupled to the at least one processor, the memory having instructions that, when executed by the at least one processor, perform operations as a plurality of units comprising:
   (1) a control unit configured to acquire a plurality of still images in a time continuous manner by the image pickup device;
   (2) a composite image generation unit configured to align the plurality of still images to generate a composite image;
   (3) an obtaining unit configured to obtain information regarding a response characteristic of an optical image blur corrector which drives the shooting optical system and/or the image pickup device; and
   (4) a setting unit configured to set an exposure time for each of the plurality of still images and a total number of the plurality of still images based on (a) information regarding a focal length of the shooting optical system, (b) information regarding an image blur correctable amount of the optical image blur corrector, and (c) the information regarding the response characteristic of the optical image blur corrector in a predetermined band of vibration applied to the image pickup apparatus.

2. The image pickup apparatus according to claim 1, wherein the setting unit sets the exposure time of each of the plurality of still images to be shorter and sets the total number of the plurality of still images to be greater in a case where an image blur correction performance according to the information regarding the focal length and the information regarding the image blur correctable amount is a first performance as compared with a case of a second performance having the image blur correction performance higher than that of the first performance.

3. The image pickup apparatus according to claim 2, wherein the setting unit determines that the image blur correction performance is higher as the image blur correctable amount is greater.

4. The image pickup apparatus according to claim 2, wherein the setting unit determines that the image blur correction performance when the focal length is a second distance is lower than the image blur correction performance when the distance length is a first distance, wherein the first distance is shorter than the second distance.

5. The image pickup apparatus according to claim 1, wherein the at least one processor further performs an operation as a detection unit configured to detect the vibration, and
   wherein the setting unit determines an image blur correction performance according to a drift characteristic of the detection unit in the predetermined band.

6. The image pickup apparatus according to claim 1, wherein the predetermined band is a low frequency band of 5 Hz or less.

7. The image pickup apparatus according to claim 1, wherein the at least one processor further performs an operation as an acquisition unit configured to acquire the information regarding the focal length, and
   wherein the acquisition unit acquires the information regarding the focal length when the image pickup apparatus is powered on, and then updates the information when the focal length is changed.

8. The image pickup apparatus according to claim 1, wherein in a case where only either one of the shooting optical system and the image pickup device is driven according to the focal length, the optical image blur corrector determines the image blur correctable amount at an optical axis angle changeable in the either one of the shooting optical system or the image pickup device to be driven.

9. The image pickup apparatus according to claim 1, wherein the setting unit calculates the image blur correctable amount based on the information regarding the focal length.

10. A control method for an image pickup apparatus, the image pickup apparatus including (a) an image pickup device that receives a light flux transmitted through a shooting optical system and performs photoelectric conversion, and (b) an optical image blur corrector that drives the shooting optical system and/or the image pickup device, the control method comprising:
    a step of acquiring a plurality of still images in a time continuous manner by the image pickup device;
    a step of aligning the plurality of still images to generate a composite image; and
    a step of setting an exposure time for each of the plurality of still images and a total number of the plurality of still images based on (a) information regarding a focal length of the shooting optical system, (b) information regarding an image blur correctable amount of the optical image blur corrector, and (c) the information regarding a response characteristic of the optical image blur corrector in a predetermined band of vibration applied to the image pickup apparatus.

11. A non-transitory computer-readable storage medium storing a program for causing a computer to execute a control method for an image pickup apparatus, the image pickup apparatus including (a) an image pickup device that receives a light flux transmitted through a shooting optical system and performs photoelectric conversion, and (b) an optical image blur corrector that drives the shooting optical system and/or the image pickup device, wherein the control method comprises:

a step of acquiring a plurality of still images in a time continuous manner by the image pickup device;

a step of aligning the plurality of still images to generate a composite image; and  a step of setting an exposure time for each of the plurality of still images and a total number of the plurality of still images based on (a) information regarding a focal length of the shooting optical system, (b) information regarding an image blur correctable amount of the optical image blur corrector, and (c) information regarding a response characteristic of the optical image blur corrector in a predetermined band of vibration applied to the image pickup apparatus.

\* \* \* \* \*